United States Patent [19]

Hartry

[11] 4,362,081

[45] Dec. 7, 1982

[54] LAMINATED HEAD OF PLASTIC SHEET MATERIAL AND NONIMPREGNATED SYNTHETIC WOVEN FABRIC MATERIAL

[75] Inventor: Donald R. Hartry, La Canada, Calif.

[73] Assignee: Remo, Inc., North Hollywood, Calif.

[21] Appl. No.: 194,461

[22] Filed: Oct. 6, 1980

[51] Int. Cl.³ .............................................. G10D 13/02
[52] U.S. Cl. .................................................... 84/414
[58] Field of Search ........................................ 84/414

[56] References Cited

U.S. PATENT DOCUMENTS

| | | | |
|---|---|---|---|
| 233,604 | 10/1880 | Deutsch | 84/414 |
| 627,766 | 6/1899 | Wilken | 84/414 |
| 729,936 | 2/1912 | Heybeck | 84/414 |
| 1,018,767 | 2/1912 | Logan | 84/414 |
| 1,116,237 | 11/1914 | Burrell | 84/414 |
| 1,301,955 | 4/1919 | McKechnie | 428/248 |
| 1,523,814 | 1/1925 | Lindsay | 428/260 |
| 1,567,556 | 12/1925 | Trenckmann et al. | 428/284 |
| 1,809,050 | 6/1931 | Logan | 84/414 |
| 2,018,182 | 10/1935 | Logan | 84/414 |
| 2,060,665 | 11/1936 | Durrant et al. | 428/274 |
| 2,110,029 | 3/1938 | Shastock | 8/118 |
| 2,112,544 | 3/1938 | Rice et al. | 428/284 |
| 2,171,505 | 8/1939 | Klinkenstein | 154/46 |
| 2,444,089 | 6/1948 | Bell et al. | 428/230 |
| 2,500,598 | 3/1950 | Axelrod | 264/229 |
| 2,655,071 | 10/1953 | Levay | 84/422 R |
| 2,667,098 | 1/1954 | McMullen | 84/414 |
| 2,830,484 | 4/1958 | Erwin | 84/414 |
| 3,285,117 | 11/1966 | Cheslow | 84/414 |
| 3,311,690 | 3/1967 | Fischer | 264/278 |
| 3,368,932 | 2/1968 | Weill et al. | 156/497 |
| 3,425,309 | 2/1969 | Elzas | 84/414 |
| 3,473,196 | 10/1969 | Hull et al. | 425/160 |
| 3,647,931 | 3/1972 | Koishikawa | 84/414 |
| 3,668,296 | 6/1972 | Criscuolo | 84/414 |
| 3,948,702 | 4/1976 | Theissen | 156/278 |
| 3,989,789 | 11/1976 | Brookhart | 264/136 |
| 4,010,306 | 3/1977 | Fagan | 428/286 |
| 4,020,209 | 4/1977 | Yuan | 428/268 |
| 4,044,180 | 8/1977 | Baker | 428/35 |
| 4,282,793 | 8/1981 | Muchnick | 84/414 |
| 4,308,782 | 1/1982 | Hartry | 84/414 |

OTHER PUBLICATIONS

DuPont Bulletin M-1J and Dupont Bulletin M-2D, Clark-Schwebel Publications.
DuPont Bulletin N-236, DuPont Bulletin NX-11, DuPont Bulletin NX-7.

*Primary Examiner*—Lawrence R. Franklin
*Attorney, Agent, or Firm*—Lyon & Lyon

[57] ABSTRACT

A laminated head for a drum or similar musical instrument comprising a synthetic plastic sheet material laminated to both sides of a synthetic fabric material woven from a fiber yarn, the fabric material being the primary tension load carrier. The synthetic woven fabric material is not impregnated by the adhesive resin composition employed in the lamination process in order to allow the individual fibers therein to move freely. The mobility of the individual fibers produces a damping effect which removes high overtones and allows the individual fibers to vibrate for a longer period of time. The laminated head thus achieves an improved sound while reducing incidents of bias fracture, thereby having a greater variety of uses in the music field.

11 Claims, 2 Drawing Figures

LAMINATED HEAD OF PLASTIC SHEET MATERIAL AND NONIMPREGNATED SYNTHETIC WOVEN FABRIC MATERIAL

BACKGROUND OF THE INVENTION

1. Field of the Invention

The present invention is directed to a head for a drum or similar musical instrument having a synthetic plastic sheet material laminated to both sides of a synthetic fabric material woven from a fiber yarn, the fabric material being the primary tension load carrier. More specifically, the laminated head of the present invention provides a head for a musical instrument which achieves an improved sound by not impregnating the fibers of the synthetic woven fabric material with the adhesive resin employed in the lamination process.

2. Description of the Prior Art

Various types of heads for drums and similar musical instruments have long been known in the art. Initially, heads were manufactured from natural skins, such as calfskin, or were woven from natural fibers, such as cotton. More recently, heads have been manufactured from various synthetic materials in efforts to overcome problems, such as moisture and temperature sensitivity, which are inherent in heads manufactured from natural materials. Also well known in the art are heads manufactured from natural or synthetic woven fabrics which are sprayed or coated on one or both sides with an adhesive or similar resin composition, as well as laminated fabric drumheads employing woven fabric materials and an adhesive resin composition in the lamination process. See, for example, Criscuolo, U.S. Pat. No. 3,668,296; Elzas, U.S. Pat. No. 3,425,309; Logan, U.S. Pat. No. 1,809,050; and Heybeck, U.S. Pat. No. 729,936.

The coating and lamination processes known in the art, as illustrated by the cited references, wet through, or impregnate, the woven fabric materials utilized in the head with the adhesive or similar resin composition employed in the coating or lamination process. Impregnation of a natural or synthetic fabric by the adhesive or similar resin composition fills the pores or openings between the individual fibers, and bonds the individual fibers together to form a rigid, heavier head. Such a rigid head has a suitable sound, but a rigid head reduces impact and tension load distribution which leads to a decrease in tear resistance and a related increase in bias fractures. Furthermore, since vibration time decreases as the weight of a head increases, some of the beneficial tonal qualities are diminished as well. Additionally, a drumstick does not respond as well when it strikes a heavier head.

While an increase in the weight of a head resulting from its impregnation by an adhesive or similar resin composition can, in part, be compensated for by using a lighter weight woven fabric in an effort to preserve the head's tonal qualities, the resulting head is not as strong due to the decrease in the fabric's weight. It, therefore, has an increased tendency to tear, including bias fractures, particularly when the fabric material is the primary load carrier.

A further problem in the art encountered in the use of conventional heads is the tendency of heads employing polyester films to deform in the playing area as a result of a drumstick striking the surface and thereby elongating, or stretching, the polyester film. Thus, over a period of time, dents form in the playing area and these heads gradually lose their tonal quality.

SUMMARY OF THE INVENTION

The present invention provides a laminated head for a drum or similar musical instrument having, as the primary tension load carrier, a synthetic fiber material woven from a fiber yarn which is laminated between layers of a synthetic plastic sheet material without impregnating the synthetic woven fabric material with the adhesive resin composition employed to bond the plastic sheet material thereto. Suitable synthetic plastic sheet materials include those sold under the mark MYLAR ®, while a suitable fabric material is of the type sold under the mark KEVLAR ®. Preferably, the adhesive resin composition employed in the lamination process has a high molecular weight as well as a high viscosity to reduce its mobility and minimize its penetration of the woven fabric material, yet still provide sufficient bond strength. The temperature, pressure and rate of the lamination process are controlled to also regulate the flow of the adhesive resin composition into the synthetic woven fabric material. Since the synthetic woven fabric material is not impregnated by the adhesive resin composition, the individual fibers are, therefore, free to move, thus producing a damping effect which removes high overtones, as well as providing greater load distribution which increases tear resistance.

Accordingly, the laminated head of the present invention has a longer vibration time and provides an improved sound by reducing harmonic dissonance. The laminated head of the present invention can be tensioned higher without tearing the head, and incidents of bias fractures are reduced since any tears occur along the woven fibers. The laminated head disclosed herein may be used with various musical instruments, such as drums, bongos, timpani, banjoes, and the like, and may also be utilized in a greater variety of uses in the music field as a result of its full range of tonal qualities and improved structural properties. Therefore, it can be utilized in such diverse situations as marching bands, drum and bugle corps, musical groups, or in the recording industry.

It is, therefore, an object of this invention to provide an improved laminated head for a drum or similar musical instrument.

It is a further object of this invention to provide a laminated head for a drum or similar musical instrument which does not impregnate a synthetic woven fabric material with the adhesive resin composition employed to laminate a synthetic plastic sheet material to both sides thereof.

It is another object of this invention to provide a laminated head for a drum or similar musical instrument in which the individual fibers in an intermediate layer of a synthetic woven fabric material are free to move, thereby producing a damping effect to remove high overtones and allowing the individual fibers to vibrate for a longer period of time, thus achieving an improved sound.

It is still another object of this invention to provide a laminated head for a drum or similar musical instrument which has improved tension and impact load distribution and is less susceptible to bias fractures.

The manner in which these and other objects and advantages of the invention are achieved will become apparent from the Detailed Description Of The Preferred Embodiment which follows and from the accompanying drawings of a preferred embodiment.

DETAILED DESCRIPTION OF THE PREFERRED EMBODIMENT

Figure 1:
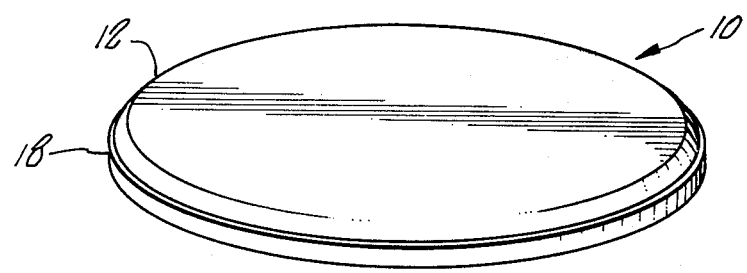
FIG. 1 is a perspective view showing a laminated head of the present invention having a top surface of a synthetic plastic sheet material mounted into a hoop.
Figure 2:
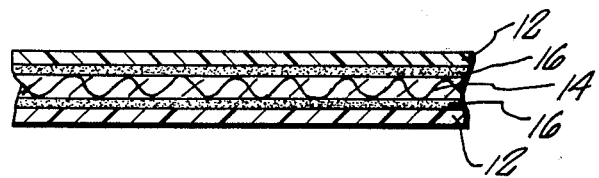
FIG. 2 is a cross-sectional view showing the synthetic woven fabric material layer laminated between a top and bottom layer of a synthetic plastic sheet material using an adhesive resin composition.

Turning in detail to the drawings, FIGS. 1 and 2 show a laminated head 10 of the present invention comprising a synthetic plastic sheet material 12 which is laminated to both sides of a synthetic fabric material 14 woven from a fiber yarn. The temperature, pressure, and rate of the lamination process are controlled to regulate the flow of the adhesive resin compositon 16 employed in the lamination process to ensure that the fabric material is not impregnated by the adhesive. The laminated head is shown mounted onto a hoop 18. The fabric material is the primary tension load carrier, while the plastic sheet material aids in distributing impact load and obtaining a greater number of fibers in the fabric to vibrate.

The outer laminated layers 12 of synthetic plastic sheet material protect the playing surface and can be given a textured mat finish to provide a "rough" striking surface for brushes. The synthetic plastic sheet material has a lower modulus of elasticity than the fabric material and is, therefore, not the primary tension load carrier. Rather, it primarily functions to distribute the impact load applied to the head by a drumstick or similar instrument. As a result, a greater number of fibers in the fabric material vibrate. Also, the top plastic sheet material presents an integral surface to the instrument which strikes the head, thereby preventing the dislocation of individual fibers in the area where the surface is struck. In addition, the bottom plastic sheet material aids in preventing the fabric material from unravelling, particularly where the head contacts the bearing edge of the instrument shell. Preferably, the plastic sheet material has a modulus of elasticity of at least 100,000 p.s.i. to limit its deformation when struck.

Since the plastic sheet material is a unitary layer, as opposed to a coating, its utilization can result in an overall weight increase to the head. To therefore avoid the attendant vibration problems inherent in heavier heads, the layers of synthetic plastic sheet material are preferably relatively thin, ranging in thickness from about 0.0005 to about 0.012 inch. Since the top plastic sheet is struck by the drumstick or similar object, it is preferably slightly thicker than the bottom plastic sheet to provide more strength. Thus, the thickness at the top sheet may range from about 0.001 to about 0.012 inch, and especially about 0.003 to about 0.005 inch, while the thickness of the bottom sheet may range between about 0.0005 to about 0.005 inch, especially from about 0.0005 to about 0.001 inch.

A particularly preferred synthetic plastic sheet material is the biaxially oriented film of the condensation polymer of ethylene glycol and terephthalic acid. Such a plastic sheet material is produced by E. I. duPont de Nemours & Co., Inc., under the registered trademark MYLAR. MYLAR ® is not susceptible to moisture and changes in the weather, has good flexibility and durability, a tensile strength of about 25,000 psi and a modulus of elasticity of about 550,000 psi. However, other synthetic plastic sheet materials, such as those sold under the marks MELINEX ®, produced by ICI Americas, Inc., CELENAR ®, by Celanese Plastics Co., Inc., and SCOTCHPAR ®, by the 3M Co., may also be successfully used in the practice of the present invention.

The synthetic fabric material 14 woven from a fiber yarn is a symmetrically woven cloth. It is the primary tension load carrier of the head of the present invention and reinforces and adds rigidity to the layers of synthetic plastic sheet material. The woven fabric material preferably has a modulus of elasticity of at least 600,000 p.s.i. and therefore principally carries the load when the laminated head is tensioned to produce the desired pitch. Thus, the stretching and elongation of the plastic sheet material when the head is struck by a drumstick or similar instrument is minimized. This reduces the amount of denting which occurs in the playing area of the head. Since the synthetic woven fabric material is the primary tension load carrier, it must also provide sufficient strength for the head. Consequently, it is preferred that the woven fabric material have a tensile breaking force between about 200 to 1000 pounds per inch in both warp and fill directions, and generally weigh between about 1.5 to about 6.0 ounces per square yard.

A particularly preferred synthetic woven fabric due to its low specific gravity and high elongation is an arimid plastic extruded as a fiber and then bundled into a yarn which is produced by E. I. duPont de Nemours & Co., Inc., under the registered trademark KEVLAR ® 49. While the weaving of the KEVLAR ® fibers into a cloth is accomplished by several different mills, KEVLAR ® 49 is principally woven into a cloth of two different weights, 2.4 ounces per square yard having a tensile breaking force of about 265 and 250 pounds per inch in the warp and fill directions, respectively, and 5.6 ounces per square yard with a tensile breaking force of about 620 and 655 pounds per inch in the warp and fill directions, respectively. Both weights have a modulus of elasticity of at least 600,000 p.s.i. and may be utilized in the laminated head of the present invention without introducing any serious vibration problems. In particular, laminated heads of the present invention which utilize KEVLAR ® 49 can be tensioned to a much greater degree than conventional heads without tearing or separating from the hoop, thereby further reducing the elongation and subsequent denting of the plastic sheet material in the playing area when struck with an object. Moreover, the high modulus of elasticity enables heads having KEVLAR ® as the primary tension load carrier to be tensioned higher than a conventional head and to maintain that tension longer. However, it should also be pointed out that other synthetic woven fabric materials may be successfully used in the practice of the present invention, including other KEVLAR ® fabrics, such as KEVLAR ® 29 which has a tighter weave and a higher elongation; the woven fabric sold under the mark NOMEX ®, also by duPont, and fabrics made from graphite fibers or carbon fibers which have a modulus of elasticity of at least 600,000 p.s.i. and tensile breaking forces of about 200 to about 1000 pounds per inch in both warp and fill directions, and which weigh between 1.5 to 6.0 ounces per square yard.

Synthetic woven fabrics oftentimes must first undergo a treatment called scrubbing before they can effectively be utilized in a lamination process. Scrubbing enhances the wetting of the woven fabric material by the adhesive resin composition used in the lamination process. While the synthetic woven fabric is not wetted through, or impregnated, by the adhesive resin composition in the laminated head of the present invention, a certain amount of adhesion is inherent in the very nature of the bond required in a lamination process. However, only the surface of the woven fabric material is wetted by the adhesive resin composition, and therefore only the uppermost fibers become bonded to the layers of synthetic plastic sheet material. Thus, the mobility of the individual fibers throughout the synthetic woven fabric layer is maintained.

The synthetic woven fabric material is not wetted through, or impregnated, by the adhesive resin composition employed in the lamination process to allow the individual fibers in the woven fabric to move freely. Therefore, the adhesive resin composition 16 preferably has a high molecular weight, high viscosity, and correspondingly low mobility to minimize its penetration of the fabric layer during the lamination process. An elastomeric high density polyolefin adhesive is presently preferred. The temperature and pressure of the lamination process are controlled to also regulate the flow of the adhesive resin composition, and the rate of the lamination of the layers of synthetic plastic material to the synthetic woven fabric is similarly controlled to further avoid the impregnation of the synthetic woven fabric. The adhesive resin composition is preferably applied to the synthetic plastic sheet material in thicknesses ranging from 0.001 to 0.004 inch and, in particular, from 0.001 to 0.002 inch. A preferred high density polyolefin adhesive can be commercially purchased already applied to MYLAR® in these thicknesses, under the name of NAP-LAM from General Binding Corp. in Northbrook, Ill.

The lamination process employed in the manufacture of the heads of the present invention must be conducted at a temperature sufficient to melt the adhesive resin composition without decomposing it, but at any rate less than 400 degrees F, above which is the temperature at which MYLAR®, or similar synthetic plastics, burns. The actual temperature of the lamination process is dependent upon the adhesive resin composition actually employed, and is within the knowledge of one having ordinary skill in the art, but will generally vary from about 200 degrees F. to about 400 degrees F., and preferably from about 325 degrees F. to about 380 degrees F. The pressure applied at the nip (e.g., where the rollers meet) during the laminating process may also vary, dependent upon the actual materials being laminated and the desired strength of the bond between the different layers of material, and is similarly within the knowledge of one having ordinary skill in the art, but will generally range from about 4.0 to 16.0 psi, and is preferably about 10.0 psi. The rate of speed of the rollers which move the different layers through the laminating process may vary from about 4 to about 25 ft/min, but is preferably about 12 ft/min to further ensure that the adhesive resin composition penetrates only the first layer of fibers in the woven fabric material to form a bond thereto but does not impregnate the synthetic woven fabric layer.

A preferred laminated head of the present invention as shown in FIGS. 1 and 2 is manufactured from KEVLAR® 49, weighing 5.6 oz/yd which is laminated between sheets of NAP-LAM. The bottom NAP-LAM sheet has a layer of MYLAR® which is approximately 0.0005 inch thick and has a 0.001 inch coating of an elastomeric high density polyethylene adhesive on one side. The top NAM-LAM sheet has a MYLAR® layer which is 0.004 inch thick, and has a 0.001 inch coating of the elastomeric high density polyethylene adhesive applied to one side thereof. The lamination process takes place at a temperature of about 375 degrees F., a pressure at the nip of about 10 psi, and the rate of speed of the rollers is about 12 ft/min. The laminated head is then mounted on a hoop with an epoxy glue in the fashion known in the art to form a head for a drum or similar musical instrument. An aluminum loop is presently preferred due to its rigidity.

The laminated head produced in accordance with the present invention has an improved sound since the mobility of the individual fibers in the synthetic woven fabric damps high overtones, and the individual fibers vibrate longer. Moreover, the head can be tensioned higher since the individual fibers are not rigidly bonded together, thereby improving load distribution and tear resistance while decreasing incidents of bias fractures. In addition, laminated heads of the present invention are still playable even after delamination occurs since they continue to provide an improved sound due to the mobility of the individual fibers. As a result of these properties, the laminated heads of the present invention can be utilized in drums, bongos, timpani, banjoes, and similar musical instruments, and have a variety of uses in the musical field, from drum and bugle corps, which require very high tension, to bands, musical groups, and recording situations.

While the preferred application of this invention has been shown and described, it will be apparent to those skilled in the art that many more modifications are possible without departing from the inventive concept herein described.

I claim:

1. A head for a drum or similar musical instrument comprising a synthetic plastic sheet material laminated to each side of a synthetic fabric material woven from a fiber yarn by means of an adhesive resin composition without impregnating the fabric material, the fabric material forming the primary tension load carrier.

2. A head as in claim 1 wherein said adhesive is an elastomeric high density polyolefin adhesive.

3. A head as in claim 2 wherein the layer of adhesive between the plastic sheet material and the fabric material has a thickness between about 0.001 to about 0.004 inch.

4. A head as in claim 1 wherein the top layer of plastic sheet material has a thickness between about 0.001 to about 0.010 inch.

5. A head as in claim 1 wherein the bottom layer of plastic sheet material has a thickness from between 0.0005 to about 0.005 inch.

6. A head as in claim 1 wherein the plastic sheet material is a biaxially oriented film of the condensation polymer of ethylene glycol and terephthalic acid.

7. A head as in claim 1 wherein the fabric material is an arimid plastic extruded as a fiber, bundled into a yarn, and woven into a fabric which has a modulus of elasticity of at least 600,000 p.s.i. and a tensile breaking force between about 200 to 1000 pounds per inch in both warp and fill directions.

8. A head as in claim 7 wherein the fabric material has a weight between about 1.5 to about 6.0 ounces per square yard.

9. A head as in claim 1 wherein the plastic sheet material distributes the impact load from an object which strikes the head, and permits a greater number of fibers in the fabric material to vibrate.

10. A head for a drum or similar musical instrument comprising a sheet of a biaxially oriented film of the condensation polymer of ethylene glycol and terephthalic acid which is laminated to each side of an arimid plastic material extruded as a fiber, bundled into a yarn, and woven into a fabric having a modulus of elasticity of at least 600,000 psi and a tensile breaking force between about 200 to about 1000 pounds per inch in both warp and fill directions by means of an adhesive resin composition without impregnating the fabric material, the top sheet having a thickness between about 0.001 to about 0.004 inch, the bottom sheet having a thickness between about 0.0005 to about 0.001 inch, and the fabric having a weight between 2.0 to about 6.0 ounces per square yard.

11. A head as in claim 10 wherein said adhesive is an elastomeric high density adhesive having a thickness between about 0.001 to about 0.002 inch.

* * * * *